(12) United States Patent
Akatsuka

(10) Patent No.: US 11,501,732 B2
(45) Date of Patent: Nov. 15, 2022

(54) ELECTRONIC APPARATUS OPERATING METHOD AND ELECTRONIC APPARATUS

(71) Applicant: SEIKO EPSON CORPORATION, Tokyo (JP)

(72) Inventor: Yuhei Akatsuka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/184,645

(22) Filed: Feb. 25, 2021

(65) Prior Publication Data

US 2021/0264871 A1 Aug. 26, 2021

(30) Foreign Application Priority Data

Feb. 25, 2020 (JP) .............................. JP2020-029377

(51) Int. Cl.
*G09G 5/00* (2006.01)
(52) U.S. Cl.
CPC ....... *G09G 5/005* (2013.01); *G09G 2340/045* (2013.01); *G09G 2340/0407* (2013.01)
(58) Field of Classification Search
None
See application file for complete search history.

(56) References Cited

U.S. PATENT DOCUMENTS

| 8,656,302 | B2 | 2/2014 | Nagano et al. |
| 8,756,348 | B2 | 6/2014 | Beel et al. |
| 9,083,769 | B2 | 7/2015 | Beel et al. |
| 9,756,096 | B1* | 9/2017 | Lilienthal ........... H04L 65/4015 |
| 2010/0095241 | A1* | 4/2010 | Nagano ................. G06F 3/0484 715/790 |
| 2015/0109537 | A1* | 4/2015 | Kompanets .......... H04N 9/3141 348/791 |
| 2016/0077659 | A1* | 3/2016 | Kim ..................... G09G 3/3607 345/173 |
| 2017/0332116 | A1* | 11/2017 | Lee ....................... H04N 21/236 |

FOREIGN PATENT DOCUMENTS

JP 2004-54134 A 2/2004

\* cited by examiner

*Primary Examiner* — Yanna Wu
(74) *Attorney, Agent, or Firm* — Dority & Manning, P.A.

(57) ABSTRACT

A method for operating as electronic apparatus includes displaying, by a display apparatus, a first image based on first image data transmitted from a first terminal apparatus to the electronic apparatus in a first area of a display surface and changing, by the first terminal apparatus the amount of the first image data transmitted by the first terminal apparatus per unit time period to the electronic apparatus in accordance with a change instruction to change the size of the first area.

8 Claims, 11 Drawing Sheets

ELECTRONIC APPARATUS OPERATING METHOD AND ELECTRONIC APPARATUS

The present application is based on, and claims priority from JP Application Serial Number 2020-029377, filed Feb. 25, 2020, the disclosure of which is hereby incorporated by reference herein in its entirety.

BACKGROUND

1. Technical Field

The present disclosure relates to an electronic apparatus operating method and an electronic apparatus.

2. Related Art

JP-A-2004-54134 discloses a display apparatus that displays an image based on image data transmitted from a terminal apparatus on a display surface. The display apparatus can change the size of the image on the display surface.

The display apparatus disclosed in JP-A-2004-54134 does not control the amount of data on the image data transmitted per unit time period from the terminal apparatus. Therefore, when the size of an image displayed on the display surface is changed, the balance between the amount of image data transmitted per unit time period and the amount of image data necessary for the image display may deteriorate. The deterioration in the balance may cause a decrease in image quality or may cause congestion in the communication between the display apparatus and the terminal apparatus.

SUMMARY

A method for operating an electronic apparatus according to an aspect of the present disclosure includes causing a display apparatus to display a first image based on first image data transmitted from a first terminal apparatus to the electronic apparatus in a first area of a display surface and causing the first terminal apparatus to change an amount of the first image data to be transmitted by the first terminal apparatus per unit time period to the electronic apparatus in accordance with a change instruction to change a size of the first area.

An electronic apparatus according to an aspect of the present disclosure includes a display control section that causes a display apparatus to display a first image based on first image data transmitted from a first terminal apparatus to the electronic apparatus in a first area of a display surface and a change section that causes the first terminal apparatus to change an amount of the first image data to be transmitted by the first terminal apparatus per unit time period to the electronic apparatus in accordance with a change instruction to change a size of the first area.

BRIEF DESCRIPTION OF THE DRAWINGS

FIG. 6 is a flowchart for describing the action of a control apparatus.

DESCRIPTION OF EXEMPLARY EMBODIMENTS

A. First Embodiment

A1. Overview of Display System 1000

Figure 1:
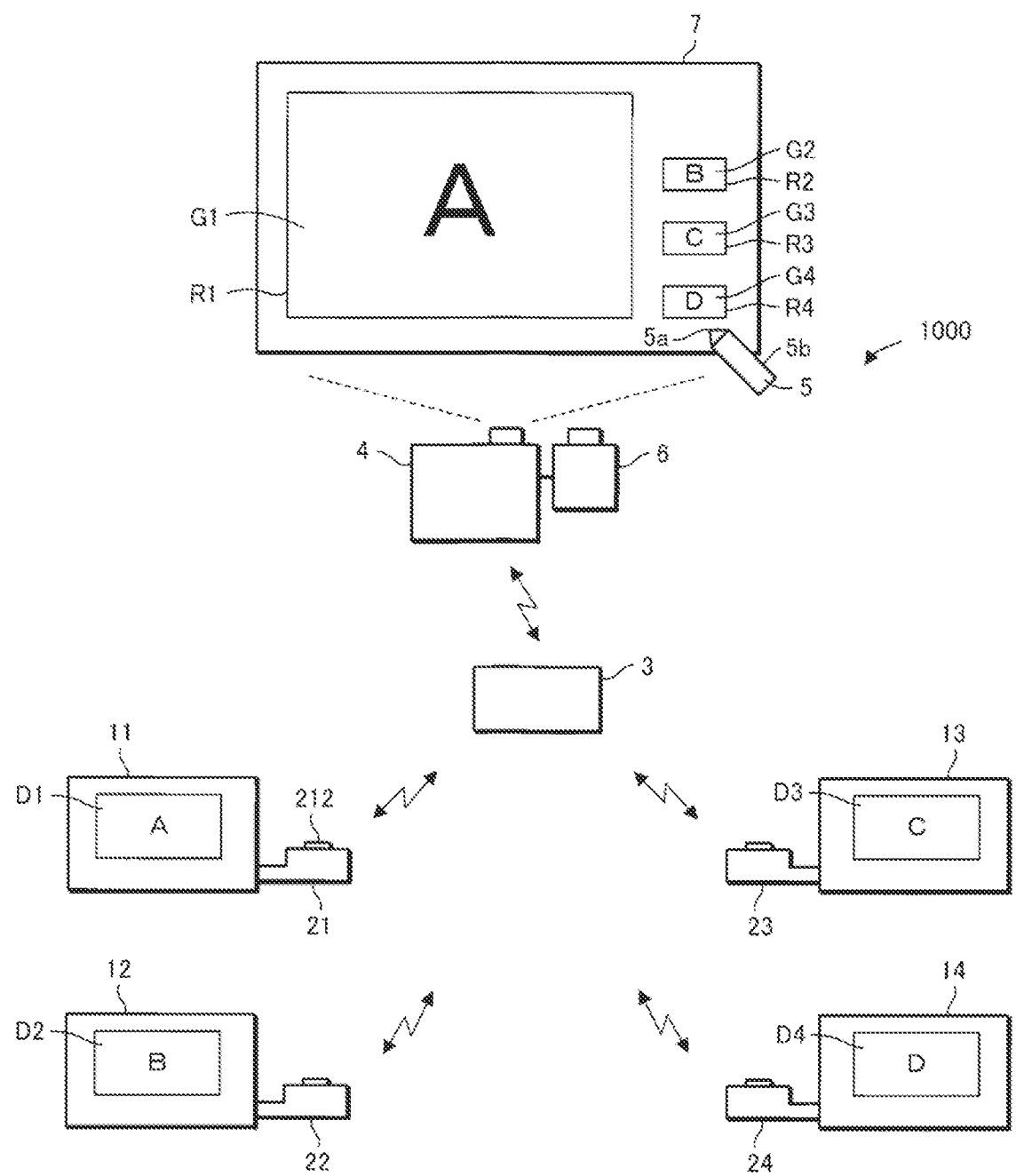
FIG. 1 shows an overview of a display system.

FIG. 1 shows a display system 1000.

The display system 1000 includes a first information processing apparatus 11 to a fourth information processing apparatus 14, a first terminal apparatus 21 to a fourth terminal apparatus 24, a control apparatus 3, a projector 4, a pointing element 5, and a camera 6.

The first information processing apparatus 11 to the fourth information processing apparatus 14 each include a common component and have a common function. The common component and the common function of the first information processing apparatus 11 to the fourth information processing apparatus 14 will be described. When it is not necessary to distinguish the first information processing apparatus 11 to the fourth information processing apparatus 14 from each other, they are referred to as "information processing apparatuses 1."

The first terminal apparatus 21 to the fourth terminal apparatus 24 each include a common component and have a common function. The common component and the common function of the first terminal apparatus 21 to the fourth terminal apparatus 24 will be described. When it is not necessary to distinguish the first terminal apparatus 21 to the fourth terminal apparatus 24 from each other, they are referred to as "terminal apparatuses 2."

The number of information processing apparatuses 1 is equal to the number of terminal apparatuses 2. The number of information processing apparatuses 1 and the number of terminal apparatuses 2 are not limited to four and only need to be at least two.

The information processing apparatuses 1 each output image data representing an image. The information processing apparatuses 1 are each, for example, be a personal computer (PC). The information processing apparatuses 1 are each not limited to a PC and may, for example, each be a tablet terminal, a smartphone, a document camera, or a terminal for video call (VC). The first information processing apparatus 11 to the fourth information processing apparatus 14 may be apparatuses different from one another in terms of type, or at least two information processing apparatuses 1 out of the first information processing apparatus 11 to the fourth information processing apparatus 14 may be apparatuses of the same type.

The terminal apparatuses 2 are connected to the information processing apparatuses 1. Specifically, the first terminal apparatus 21 is physically connected to the first information processing apparatus 11. The second terminal apparatus 22 is physically connected to the second information processing apparatus 12. The third terminal apparatus 23 is physically connected to the third information processing apparatus 13. The fourth terminal apparatus 24 is physically connected to the fourth information processing apparatus 14. The terminal apparatuses 2 are each also referred to as a "dongle." The terminal apparatuses 2 each receive the image data outputted by the corresponding information processing apparatus 1 connected to the terminal apparatus 2.

The terminal apparatuses 2 communicate with the control apparatus 3. The terminal apparatuses 2 transmit the image data to the control apparatus 3. For example, the terminal apparatuses 2 each transmit the image data received from the corresponding information processing apparatus 1 connected to the terminal apparatus 2 to the control apparatus 3.

The control apparatus 3 is, for example, a communication apparatus. The control apparatus 3 receives the image data from the terminal apparatuses 2. For example, the control apparatus 3 receives first image data representing a first image G1 from the first terminal apparatus 21. The control apparatus 3 receives second image data representing a second image G2 from the second terminal apparatus 22. The control apparatus 3 receives third image data representing a third image G3 from the third terminal apparatus 23. The control apparatus 3 receives fourth image data representing a fourth image G4 from the fourth terminal apparatus 24.

The control apparatus 3 causes the projector 4 to project an image on a display surface 7 based on the image data received from the terminal apparatuses 2. For example, the control apparatus 3 causes the projector 4 to project the first image G1 based on the first image data, the second image G2 based on the second image data, the third image G3 based on the third image data, and the fourth image G4 based on the fourth image data on the display surface 7. The control apparatus 3 is an example of an electronic instrument. The electronic apparatus is not limited to the control apparatus 3 and only needs to be an instrument or a circuit having the same function as that of the control apparatus 3.

The projector 4 displays a variety of images on the display surface 7. The display surface 7 is a screen. The display surface 7 is not limited to a screen and may, for example, be a whiteboard, a wall, a ceiling, a floor, or a door. The projector 4 is controlled by the control apparatus 3. The projector 4 projects images based on the image data received by the control apparatus 3 from the terminal apparatuses 2 on the display surface 7 to display the images on the display surface 7. The projector 4 is an example of a display apparatus. The display apparatus is not limited to the projector 4 and may, for example, be a flat panel display (FPD). The FPD is, for example, a liquid crystal display, a plasma display, or an organic electro luminescence (EL) display.

The pointing element 5 is, for example, a pen-shaped pointing tool. The pointing element 5 does not necessarily have the shape of a pen and may, for example, have the shape of a circular column, a quadrangular column, a cone, or a pyramid. A user uses the pointing element 5 to manipulate images projected by the projector 4 on the display surface 7. For example, the user holds a shaft 5b of the pointing element 5 and causes a tip 5a of the pointing element 5 to come into contact with an image on the display surface 7 to select the image. The tip 5a of the pointing element 5 is provided with a switch and a light emitter. The switch is turned on when the tip 5a of the pointing element 5 comes into contact with an object, such as the display surface 7. The light emitter is an LED (light emitting diode) that outputs infrared light. The light emitter is not limited to an LED and may, for example, be an LD (laser diode) that outputs infrared light. The light emitter outputs infrared light when the switch is turned on. Therefore, when the tip 5a of the pointing element 5 comes into contact with an image on the display surface 7, the tip 5a of the pointing element 5 outputs infrared light.

The camera 6 produces captured image data by capturing an image of the display surface 7. The captured image data is analyzed by the projector 4. For example, the projector 4 analyzes the captured image data to produce position data that identifies the position of the tip 5a of the pointing element 5 with respect to the display surface 7. The produced position data is transmitted to the control apparatus 3. The control apparatus 3 analyzes the transmitted position data to identify an image selected by the tip 5a of the pointing element 5 and identifies the image selected by the tip 5a of the pointing element 5 as a selected image. As an example, the control apparatus 3 identifies an image displayed at the location where the tip 5a of the pointing element 5 is located as the selected image out of images displayed on the display surface 7. The control apparatus 3 changes the size of the selected image.

A2: Overview of Display Operation

Figure 2:
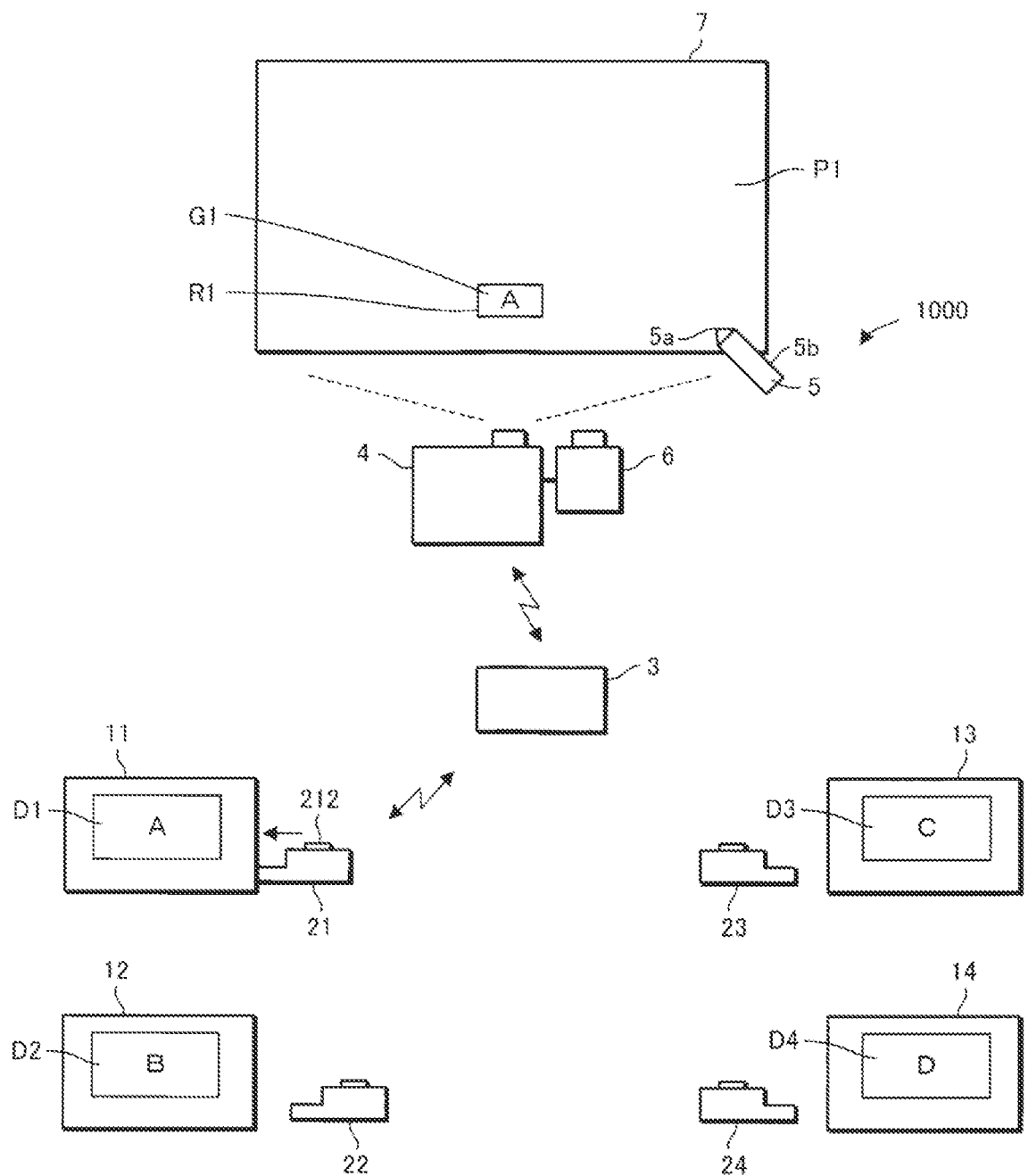
FIG. 2 shows an example of a first projection image.

An overview of the display operation performed by the display system 1000 will be described. FIG. 2 shows an example of a first projection image P1 displayed on the display surface 7 when the first terminal apparatus 21 is coupled to the first information processing apparatus 11 in a situation in which the terminal apparatus 2 is not coupled to any of the second information processing apparatus 12 to the fourth information processing apparatus 14.

When the first terminal apparatus 21 is coupled to the first information processing apparatus 11, the projector 4 displays the first projection image P1 on the display surface 7, as shown in FIG. 2 by way of example.

The first projection image P1 contains the first image G1 representing the same content that a first display image D1 displayed by the first information processing apparatus 11 represents. In the first projection image P1, the position of the first image G1 is not limited to the position shown in FIG. 2 and is changeable as appropriate. The ratio of the size of the first image G1 to the size of the first projection image P1 is not limited to the ratio shown in FIG. 2 and is changeable as appropriate. It is, however, noted that the ratio of the size of the first image G1 to the size of the first projection image P1 is greater than zero but smaller than one. The projector 4 displays the first projection image P1 on the display surface 7 to display the first image G1 in a first area R1 of the first surface 7. The first area R1 has a first size S1. The first image G1 therefore also has the first size S1. The first display image D1 and the first image G1 represent a letter "A". The first display image D1 and the first image G1 are each not limited to an image representing the letter "A" and is changeable as appropriate.

Figure 3:
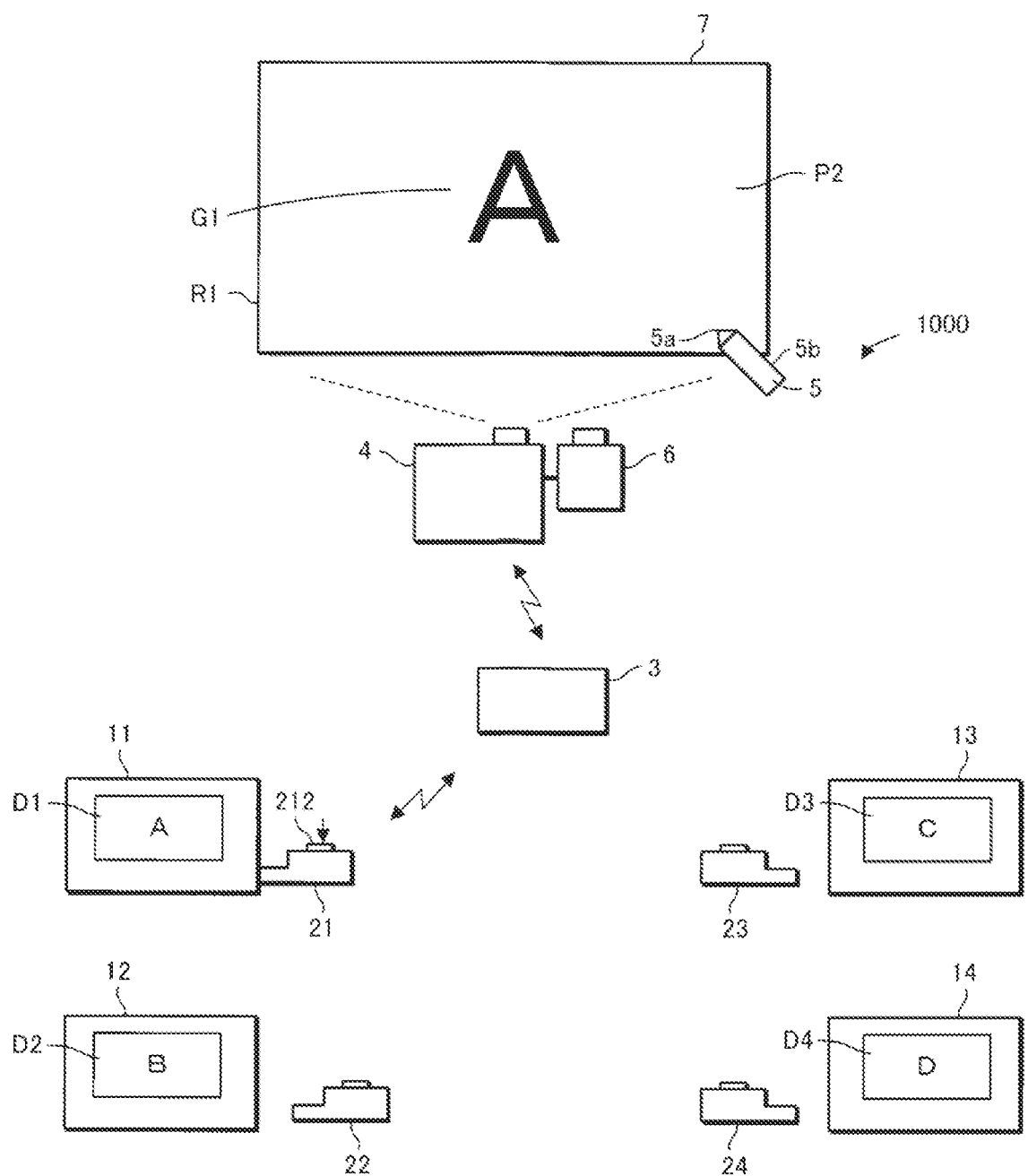
FIG. 3 shows an example of a second projection image.

When a first operation section 212 of the first terminal apparatus 21 is operated in the situation in which the projector 4 displays the first image G1 in the first area R1 having the first size S1, the projector 4 displays a second projection image P2 in place of the first projection image P1 on the display surface 7, as shown in FIG. 3 by way of example.

The second projection image P2 contains the first image G1. The projector 4 displays the second projection image P2 on the display surface 7 to display the first image G1 in the first area R1 having a second size S2 greater than the first size S1. The first image G1 therefore has the second size S2. The ratio of the second size S2 to the size of the second projection image P2 is not limited to the ratio shown in FIG. 3 and only needs to be greater than the ratio of the first size S1 to the size of the first projection image P1. In the second projection image P2, the position of the first image G1, that is, the position of the first area R1 is not limited to the position shown in FIG. 3 and is changeable as appropriate.

Figure 4:
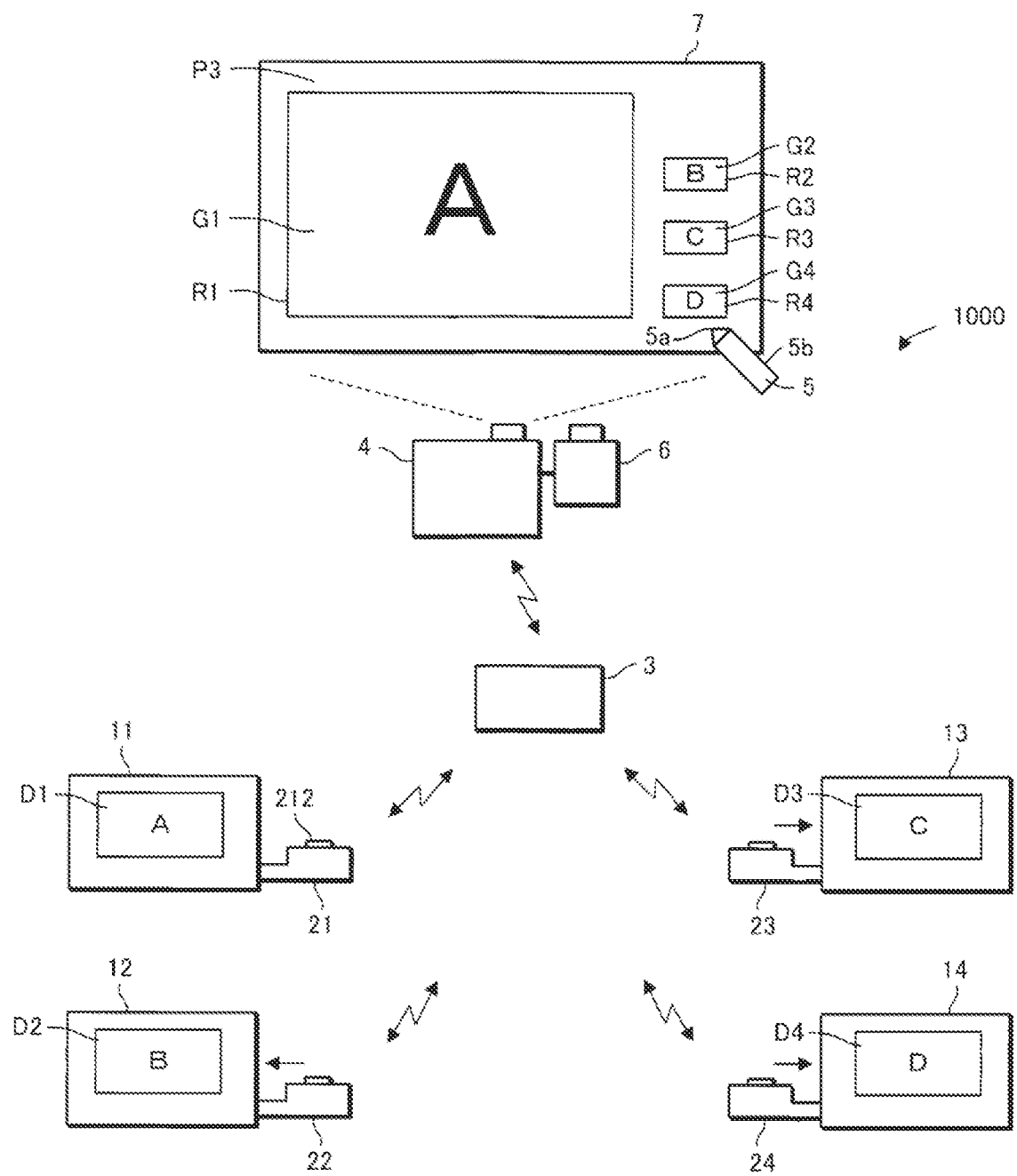
FIG. 4 shows an example of a third projection image.

When the second terminal apparatus 22 is coupled to the second information processing apparatus 12, the third terminal apparatus 23 is coupled to the third information processing apparatus 13, and the fourth terminal apparatus 24 is coupled to the fourth information processing apparatus 14 in the situation in which the projector 4 displays the first image G1 in the first area R1 having the second size S2, the projector 4 changes the second projection image P2 shown in FIG. 3 by way of example to a third projection image P3 shown in FIG. 4 by way of example.

In the third projection image P3, the size of the first area R1 is changed to a third size S3 greater than the first size S1 but smaller than the second size S2, the second image G2 is displayed in a second area R2 having the first size S1, the third image G3 is displayed in a third area R3 having the first size S1, and the fourth image G4 is displayed in a fourth area R4 having the first size S1. The first area R1, the second area R2, the third area R3, and the fourth area R4 do not overlap with each other. At least two of the first area R1, the second area R2, the third area R3, and the fourth area R4 may only partially overlap with each other. In the third projection image P3, the positions of the first image G1, the second image G2, the third image G3, and the fourth image G4 are not limited to the positions shown in FIG. 4 and are changeable as appropriate.

The second image G2 represents the same content that a second display image D2 displayed by the second information processing apparatus 12 represents. The second display image D2 and the second image G2 represent a letter "B". The second display image D2 and the second image G2 are each not limited to an image representing the letter "B" and is changeable as appropriate.

The third image G3 represents the same content that a third display image D3 displayed by the third information processing apparatus 13 represents. The third display image D3 and the third image G3 represent a letter "C". The third display image D3 and the third image G3 are each not limited to an image representing the letter "C" and is changeable as appropriate.

The fourth image G4 represents the same content that a fourth display image D4 displayed by the fourth information processing apparatus 14 represents. The fourth display image D4 and the fourth image G4 represent a letter "D". The fourth display image D4 and the fourth image G4 are each not limited to an image representing the letter "D" and is changeable as appropriate.

Figure 5:
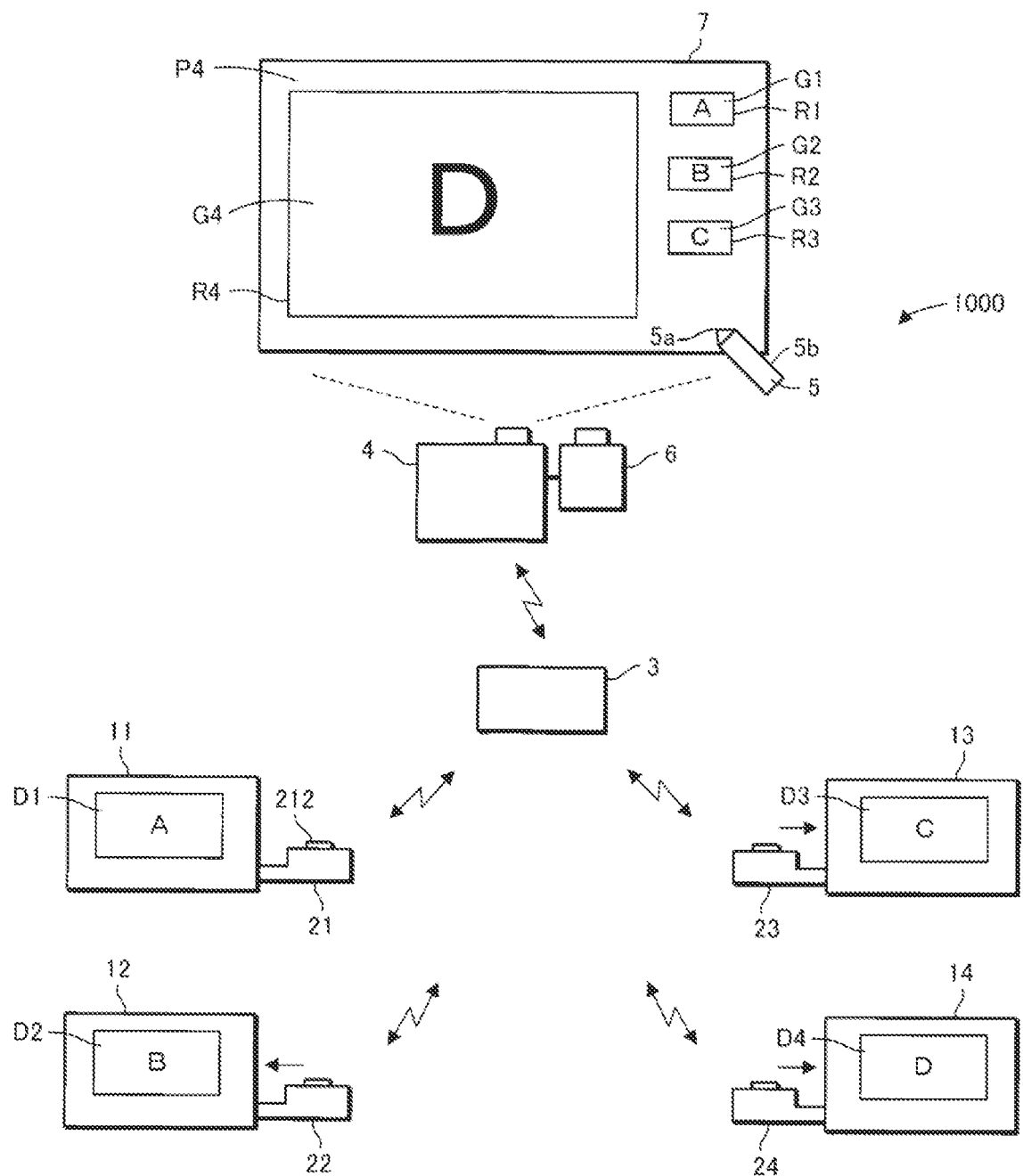
FIG. 5 shows an example of a fourth projection image.

In the third projection image P3 shown in FIG. 4 by way of example, when the fourth image G4 is manipulated with the pointing element 5, the projector 4 changes the third projection image P3 to a fourth projection image P4, as shown in FIG. 5 by way of example. In the fourth projection image P4, the size of the first area R1 is changed from the third size S3 to the first size S1, and the size of the fourth area R4 is changed from the first size S1 to the third size S3. Further, the position of the fourth area R4 having the third size S3 is changed to the position of the first area R1 having had the third size S3, and the position of the first area R1 having the first size S1 is changed to a position where the first area R1 does not overlap with any of the second area R2, the third area R3, and the fourth area R4. In the fourth projection image P4, the positions of the first image G1, the second image G2, the third image G3, and the fourth image G4 are not limited to the positions shown in FIG. 5 and are changeable as appropriate.

The control apparatus 3 controls transmission of image data representing each of the first image G1 to the fourth image G4, from the terminal apparatuses 2 in accordance with the size of each of the first image G1 to the fourth image G4 to be displayed on the display surface 7. Specifically, the control apparatus 3 controls the amount of image data transmitted per unit time period from the terminal apparatuses 2. An example of the display system 1000 including the thus configured control apparatus 3 will be described below.

A3: Example of Display System 1000

Figure 6:
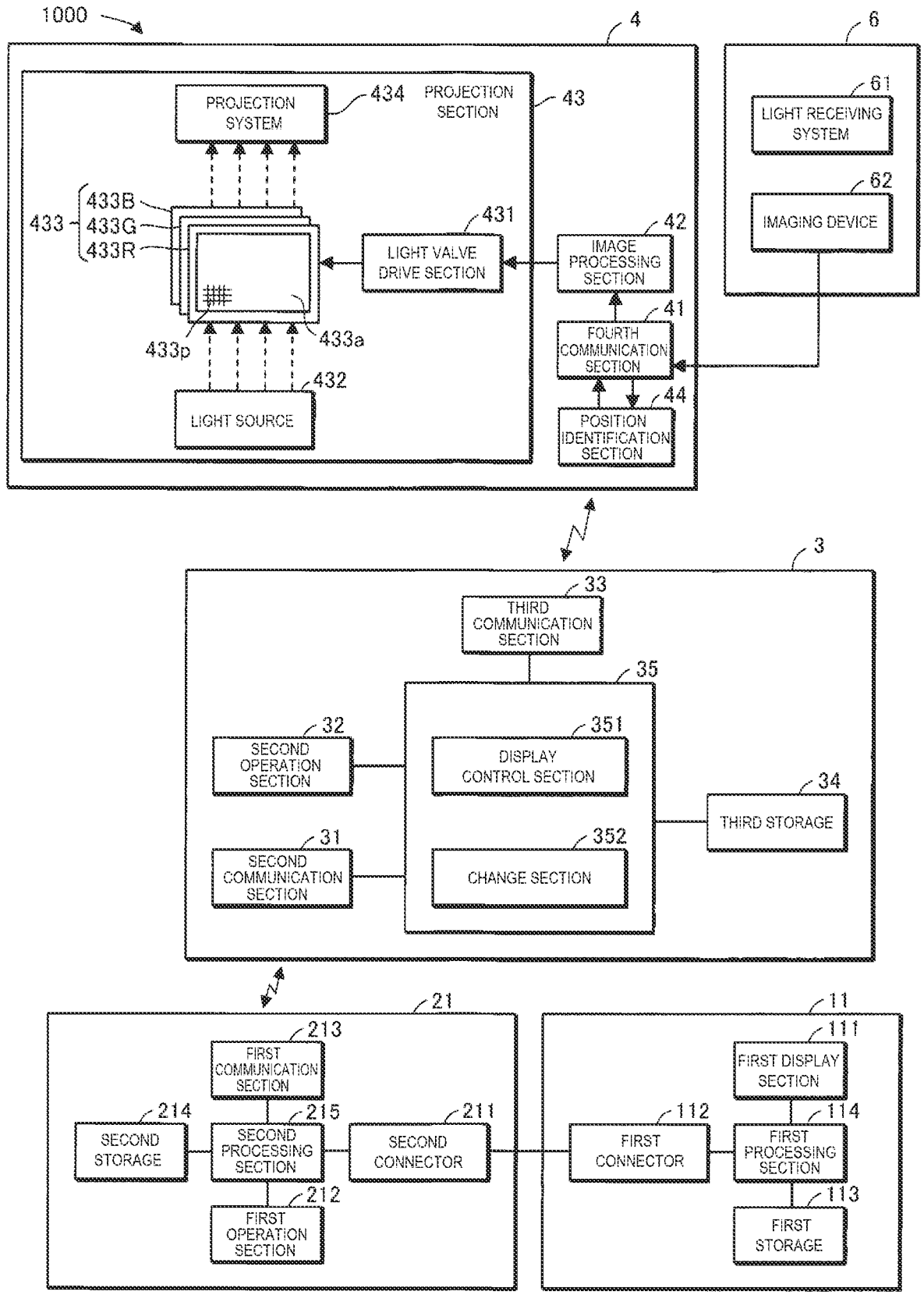
FIG. 6 shows an example of the display system.

FIG. 6 shows an example of the display system 1000. In FIG. 6, the second information processing apparatus 12 to the fourth information processing apparatus 14 and the second terminal apparatus 22 to the fourth terminal apparatus 24 are omitted for simplification of the description.

A4: First Information Processing Apparatus 11

The first information processing apparatus 11 includes a first display section 111, a first connector 112, a first storage 113, and a first processing section 114. The first display section 111, the first connector 112, the first storage 113, and the first processing section 114 are common components in the first information processing apparatus 11 to the fourth information processing apparatus 14.

The first display section 111 is a display that displays a variety of images. The first display section 111 is, for example, a liquid crystal display. The first display section 111 is not limited to a liquid crystal display and may, for example, be a plasma display or an organic EL display.

The first connector 112 is, for example, a USB (universal serial bus) connector. The first connector 312 is not limited to a USB connector and is changeable as appropriate.

The storage 113 is a recording medium readable by the first processing section 114. The first storage 113 includes, for example, a nonvolatile memory and a volatile memory. The nonvolatile memory is, for example, a ROM (read only memory), an EPROM (erasable programmable read only memory), or an EEPROM (electrically erasable programmable read only memory). The volatile memory is, for example, a RAM (random access memory).

The first storage 113 stores a program executed by the first processing section 114 and a variety of data used by the first processing section 114. The variety of data contains image data.

The first processing section 114 is formed, for example, of one processor or two or more processors. As an example, the first processing section 114 is formed of one CPU (central processing unit) or two or more CPUs. Part or entirety of the functions of the first processing section 114 may be achieved, for example, by a DSP (digital signal processor), an ASIC (application specific integrated circuit), a PLD (programmable logic device), or an FPGA (field programmable gate array). The first processing section 114 concurrently or successively performs a variety of types of processing. The first processing section 114 reads the program from the first storage 113. The first processing section 114 executes the program to perform a variety of actions. For example, the first processing section 114 reads image data from the first storage 113. The first processing section 114 causes the first display section 111 to display an image based on the image data. The first processing section 114 transmits the image data to the first terminal apparatus 21 via the first connector 112.

A5: First Terminal Apparatus 21

The first terminal apparatus 21 includes a second connector 211, a first operation section 212, a first communication section 213, a second storage 214, and a second processing section 215. The second connector 211, the first operation section 212, the first communication section 213, the second storage 214, and the second processing section 215 are common components in the first terminal apparatus 21 to the fourth terminal apparatus 24.

The second connector 211 is, for example, a USB connector. The second connector 211 is connectable to the first connector 112 of the first information processing apparatus 11. The second connector 211 is not limited to a USB connector and may be any connector connectable to the first connector 112. In FIG. 6, the second connector 211 and the first connector 112 are connected to each other via a line for simplification of the description, but the second connector 211 is directly coupled to the first connector 112. The second connector 211 and the first connector 112 may be coupled to each other, for example, by using a wireless scheme, such as near field communication (NFC).

The first operation section 212 includes, for example, one operation button or two or more operation buttons. The first operation section 212 receives the user's operation. The first operation section 212 is used, for example, to change the size of the first area R1, that is, the size of the first image G1.

The first communication section 213 communicates with the control apparatus 3. The first communication section 213 wirelessly communicates with the control apparatus 3 by using Wi-Fi. Wi-Fi is an example of a short distance wireless scheme. The first communication section 213 may instead wirelessly communicate with the control apparatus 3 by using an infrared communication scheme or Bluetooth in place of Wi-Fi. Bluetooth is a registered trademark. The infrared communication scheme and Bluetooth are other examples of the short distance wireless scheme. The scheme of the wireless communication between the first communication section 213 and the control apparatus 3 is not limited to a short distance wireless scheme and may instead be another communication scheme.

The second storage 214 is a recording medium readable by the second processing section 215. The second storage 214 includes, for example, a nonvolatile memory and a volatile memory. The second storage 214 stores a program executed by the second processing section 215 and a variety of data used by the second processing section 215.

The second processing section 215 is formed, for example, of one processor or two or more processors. As an example, the second processing section 215 is formed of one CPU or two or more CPUs. Part or entirety of the functions of the second processing section 215 may be achieved by a circuit, such as a DSP, an ASIC, a PLD, and an FPGA. The second processing section 215 concurrently or successively performs a variety of types of processing.

The second processing section 215 reads the program from the second storage 214. The second processing section 215 executes the program to perform a variety of actions. For example, the second processing section 215 receives the first image data from the first information processing apparatus 11. The second processing section 215 transmits the first image data to the control apparatus 3 via the first communication section 213.

The second processing section 215, for example, adjusts the amount of first image data to be transmitted per unit time period to the control apparatus 3 under the control of the control apparatus 3. The amount of first image data to be transmitted by the first terminal apparatus 21 per unit time period to the control apparatus 3 is hereinafter referred to as a "first amount of transmitted data." When the size of the first area R1 increases, in other words, when the size of the first image G1 on the display surface 7 increases, the second processing section 215 increases in accordance with a request from the control apparatus 3 the first amount of transmitted data when the first image data is transmitted to a second communication section 31, which will be described later, via the first communication section 213. When the size of the first area R1 decreases, in other words, when the size of the first image G1 on the display surface 7 decreases, the second processing section 215 decreases in accordance with a request from the control apparatus 3 the first amount of transmitted data when the first image data is transmitted to the second communication section 31, which will be described later, via the first communication section 213. The second processing section 215 may not adjust the first amount of transmitted data when the first image data is transmitted to the second communication section 31, which will be described later, via the first communication section 213, but the first processing section 114 may adjust the first amount of transmitted data when the first image data is transmitted to the first terminal apparatus 21 via the first connector.

A6: Control Apparatus 3

The control apparatus 3 includes the second communication section 31, a second operation section 32, a third communication section 33, a third storage 34, and a third processing section 35. The second communication section 31 wirelessly communicates by using Wi-Fi with each of the first terminal apparatus 21 to the fourth terminal apparatus 24. The second communication section 31 does not necessarily communicate with each of the first terminal apparatus 21 to the fourth terminal apparatus 24 by using Wi-Fi, unlike the above description, and may instead communicate therewith by using another wireless communication scheme.

The second operation section 32 includes, for example, one operation button or two or more operation buttons. The second operation section 32 receives the user's operation. The second operation section 32 is used, for example, to change the size of each of the first area R1, the second area R2, the third area R3, and the fourth area R4, in other words, the size of the first image G1 on the display surface 7, the size of the second image G2 on the display surface 7, the size of the third image G3 on the display surface 7, and the size of the fourth image G4 on the display surface 7.

The third communication section 33 communicates with the projector 4 by using wired USB communication. The third communication section 33 does not necessarily communicate with the projector 4 by using USB wired communication and may instead communicate therewith by using another type of wired communication or wireless communication, such as Bluetooth and Wi-Fi.

The third storage 34 is a recording medium readable by the third processing section 35. The third storage 34 includes, for example, a nonvolatile memory and a volatile memory. The third storage 34 stores a program executed by the third processing section 35 and a variety of data used by the third processing section 35.

The third processing section 35 is formed, for example, of one processor or two or more processors. As an example, the third processing section 35 is formed of one CPU or two or more CPUs. Part or entirety of the functions of the third processing section 35 may be achieved by a circuit, such as a DSP, an ASIC, a PLD, and an FPGA. The third processing section 35 concurrently or successively performs a variety of types of processing.

The third processing section 35 reads the program from the third storage 34. The third processing section 35 executes the program to achieve a display control section 351 and a change section 352.

The display control section 351 controls the projector 4. For example, the display control section 351 causes the projector 4 to display the first image G1 in the first area R1. The display control section 351 causes the projector 4 to display the second image G1 in the second area R2. The display control section 351 causes the projector 4 to display the third image G3 in the third area R3. The display control section 351 causes the projector 4 to display the fourth image G4 in the fourth area R4.

The display control section 351 produces projection image data representing a projection image to be projected by the projector 4 on the display surface 7. For example, the display control section 351 uses the first image data to produce first projection image data representing the first projection image P1 shown in FIG. 2 by way of example. The display control section 351 transmits the projection image data to the projector 4 via the third communication section 33. The display control section 351 may be formed of one circuit or two or more circuits, such as one display controller or two or more display controllers and one display control circuit or two or more display control circuits.

The change section 352 controls the amount of image data to be transmitted by each of the terminal apparatuses 2 per unit time period to the control apparatus 3.

For example, the change section 352 causes the first terminal apparatus 21 to change the amount of first image data to be transmitted by the first terminal apparatus 21 per unit time period to the control apparatus 3, that is, the first amount of transmitted data in accordance with a change instruction to change the size of the first area R1.

As an example, the change section 352 causes the first terminal apparatus 21 to change the resolution of the first image data to change the first amount of transmitted data in accordance with the change instruction.

When the change instruction is a reduction instruction to reduce the first area R1, the change section 352 causes the first terminal apparatus 21 to decrease the first amount of transmitted data.

When the change instruction is an enlargement instruction to enlarge the first area R1, the change section 352 causes the first terminal apparatus 21 to increase the first amount of transmitted data.

The change section 352 receives, as the change instruction, operation of selecting the first image G1 in a situation in which the projector 4 displays the first image G1 in the first area R1 and the second image G2 in the second area R2.

For example, the change section 352 receives, as the change instruction, operation of selecting the first image G1 in a situation in which the projector 4 displays the first image G1 in the first area R1 having the first size S1 and the second image G2 in the second area R2 having the first size S1, as shown in FIG. 5 by way of example. In this case, the change section 352 identifies the first image G1 as the selected image.

The change section 352 may be formed of one circuit or two or more circuits, such as one change controller or two or more change controller and one change circuit or two or more change circuits.

A7: Projector 4

The projector 4 includes a fourth communication section 41, an image processing section 42, a projection section 43, and a position identification section 44. The fourth communication section 41 wirelessly communicates with the control apparatus 3 by using Bluetooth. The fourth communication section 41 does not necessarily communicate with the control apparatus 3 by using Bluetooth as described above but by using another communication scheme. The fourth communication section 41 receives the projection image data from the control apparatus 3. The fourth communication section 41 transmits the captured image data transmitted from the camera 6 to the position identification section 44, as will be described later. The fourth processing section 41 may transmit the captured image data to the control apparatus 3.

The image processing section 42 is formed of one circuit or two or more circuits, such as one image processor or two or more image processors. The image processing section 42 receives the projection image data via the fourth communication section 41. The image processing section 42 performs image processing on the projection image data to produce a drive signal. The image processing performed by the image processing section 42 includes, for example, a color correction process of correcting the color of an image to be projected by the projection section 43. The image processing is not limited to the color correction process and may, for example, be a gamma correction process.

The projection section 43 projects a projection image based on the drive signal, specifically, a projection image based on the projection image data on the display surface 7. The projection section 43 includes a light valve drive section 431, a light source 432, a liquid crystal light valve for red 433R, a liquid crystal light valve for green 433G, a liquid crystal light valve for blue 433B, and a projection system 434. When it is not necessary to distinguish the liquid crystal light valve for red 433R, the liquid crystal light valve for green 433G, and the liquid crystal light valve for blue 433B from each other, they are referred to as "liquid crystal light valves 433."

The light valve drive section 431 is formed, for example, of a circuit, such as a driver. The light valve drive section 431 produces drive voltage based on the drive signal provided from the image processing section 42. The light valve drive section 431 drives the liquid crystal light valves 433 by applying the drive voltage to the liquid crystal light valves 433.

The light source 432 is, for example, an LED (light emitting diode). The light source 432 is not limited to an LED and may, for example, be a xenon lamp, an ultrahigh-pressure mercury lamp, or a laser light source. The light source 432 outputs light. The light outputted from the light source 432 enters an optical integration system that is not shown. The optical integration system reduces variation in the luminance distribution of the light incident thereon. The light outputted from the light source 432 passes through the optical integration system and is then separated by a color separation system that is not shown into red, green, and blue color light components, which are the three primary colors of light. The red color light component is incident on the liquid crystal light valve for red 433R. The green color light component is incident on the liquid crystal light valve for green 433G. The blue color light component is incident on the liquid crystal light valve for blue 433B.

The liquid crystal light valves 433 are each formed, for example, of a liquid crystal panel including a liquid crystal material sandwiched between a pair of transparent substrates. The liquid crystal light valves 433 each have a rectangular pixel area 433a. The pixel area 433a includes a plurality of pixels 433p arranged in a matrix. In the liquid crystal light valves 433, the drive voltage based on the projection image data is applied to the liquid crystal material for each of the pixels 433p. When the light valve drive section 431 applies the drive voltage to each of the pixels 433p, the light transmittance at the pixel 433p is set at light transmittance based on the drive voltage. The light outputted from the light source 432 is modulated when passing through the pixel area 433a. An image based on the projection image data is thus formed on a color light basis. The liquid crystal light valves 433 are an example of a light modulator.

The color images are combined with one another by a color combining system that is not shown for each of the pixels 433p. A color image is thus produced. The color image is projected via the projection system 434.

The position identification section 44 is formed, for example, of one processor or two or more processors. The position identification section 44 may be formed of a circuit, such as a DSP, an ASIC, a PLD, and an FPGA. The position identification section 44 analyzes the captured image data transmitted via the fourth communication section 41 to produce the position data that identifies the position of the tip 5a of the pointing element 5 with respect to the display surface 7. The position identification section 44 transmits the produced position data to the fourth communication section 41. The fourth communication section 41 transmits the position data transmitted from the position identification section 44 to the control apparatus 3.

A8: Camera 6

The camera 6 includes a light receiving system 61, such as a lens, and an imaging device 62, which converts light collected by the light receiving system 61 into an electric signal. The imaging device 62 is, for example, a CCD (charge coupled device) image sensor that receives light that belongs to the infrared region and the visible light region. The imaging device 62 is not limited to a CCD image sensor and may instead, for example, be a CMOS (complementary metal oxide semiconductor) image sensor that receives light that belongs to the infrared region and the visible light region.

The camera 6 produces captured image data by capturing an image of the display surface 7. For example, when the camera 6 captures an image of the display surface 7 in a situation in which the tip 5a of the pointing element 5 is in contact with the first image G1 on the display surface 7, the camera 6 produces captured image data representing the first image G1 in contact with the tip 5a emitting infrared light. The captured image data is transmitted to the position identification section 44 of the projector 4 via the fourth communication section 41 of the projector 4. The position identification section 44 of the projector 4 analyzes the captured image data to produce position data that identifies the position of the tip 5a of the pointing element 5 with respect to the display surface 7. The produced position data is transmitted to the control apparatus 3 via the fourth communication section 41. The change section 352 of the control apparatus 3 analyzes the position data to detect operation of selecting any of the first image G1 to the fourth image G4.

A9: Action of Terminal Apparatus 2 Performed When Terminal Apparatus 2 is Coupled to Information Processing Apparatus 1

Figure 7:
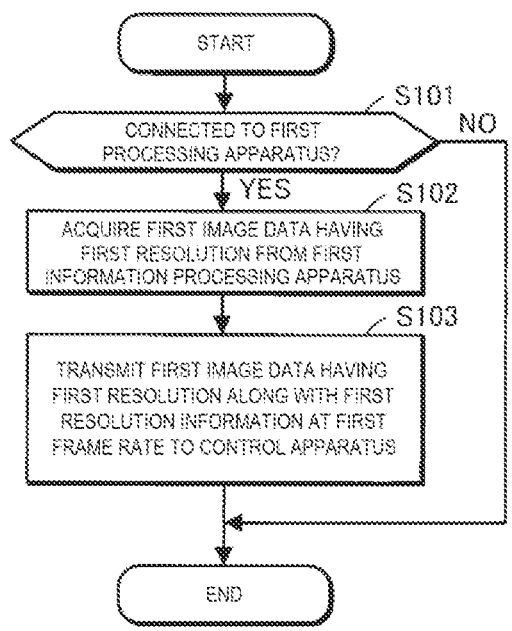
FIG. 7 is a flowchart for describing the action of a first terminal apparatus.

The action of an terminal apparatus 2 performed when the terminal apparatus 2 is connected to an information processing apparatus 1 will next be described. The first terminal apparatus 21 is used as an example of the terminal apparatuses 2, and the first information processing apparatus 11 is used as an example of the information processing apparatuses 1 for simplification of the description. FIG. 7 is a flowchart for describing the action of the first terminal apparatus 21 performed when the first terminal apparatus 21 is coupled to the first information processing apparatus 11.

When the second connector 211 of the first terminal apparatus 21 is coupled to the first connector 112 of the first information processing apparatus 11 in step S101, the second processing section 215 acquires the first image data having first resolution from the first information processing apparatus 11 in step S102.

In step S102, for example, the second processing section 215 transmits a first request that requests the first image data having the first resolution to the first information processing apparatus 11 via the second connector 211 and acquires the first image data having the first resolution transmitted from the first information processing apparatus 11 via the second connector 211 in response to the first request.

The second processing section 215 subsequently transmits the first image data having the first resolution to the control apparatus 3 at a first frame rate via the first communication section 213 in step S103. In step S103, the second processing section 215 transmits first resolution information representing the first resolution to the control apparatus 3 via the first communication section 213 in addition to the first image data having the first resolution.

A10: Action of Control Apparatus 3 Accompanying Connection Between Terminal Apparatus 2 and Information Processing Apparatus 1

Figure 8:
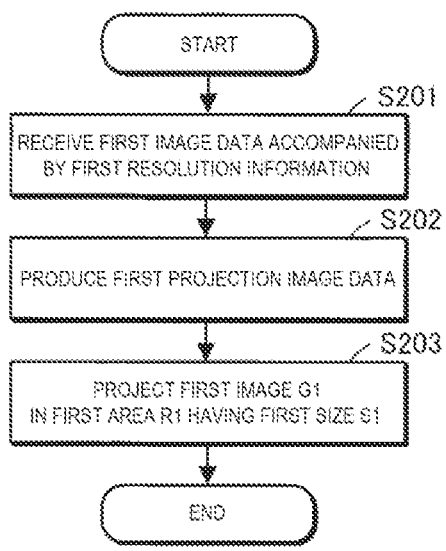

The action of the control apparatus 3 accompanying the connection between a terminal apparatus 2 and an information processing apparatus 1 will next be described. It is assumed for simplification of the description that the first terminal apparatus 21 is used as an example of the terminal apparatuses 2, that the first information processing apparatus 11 is used as an example of the information processing apparatuses 3, and that no image data is transmitted from any of the second terminal apparatus 22 to the fourth terminal apparatus 24. FIG. 8 is a flowchart for describing the action of the control apparatus 3 accompanying the connection between the first terminal apparatus 21 and the first information processing apparatus 11.

When the display control section 351 of the control apparatus 3 receives the first image data having the first resolution accompanied by the first resolution information via the second communication section 31 in step S201 in a situation in which the display control section 351 receives no image data, the display control section 351 uses the first image data having the first resolution to produce the first projection image data representing the first projection image P1 in step S202.

The display control section 351 subsequently transmits the first projection image data to the projector 4 via the third communication section 33 to cause the projector 4 to project the first projection image P1 on the display surface 7 in step S203, as shown in FIG. 2 by way of example. That is, the display control section 351 causes the projector 4 to display the first image G1 in the first area R1.

As described above, when a terminal apparatus 2 is connected to an information processing apparatus 1, the terminal apparatus 2 transmits the first image data acquired from the information processing apparatus 1 to the control apparatus 3, and the control apparatus 3 causes the projector 4 to display the first image G1 that the first image data represents.

Therefore, when the user connects a terminal apparatus 2 to an information processing apparatus 1, transmission of the first image data automatically starts. The user's operation necessary for the transmission of the first image data can therefore be simplified.

Figure 9:
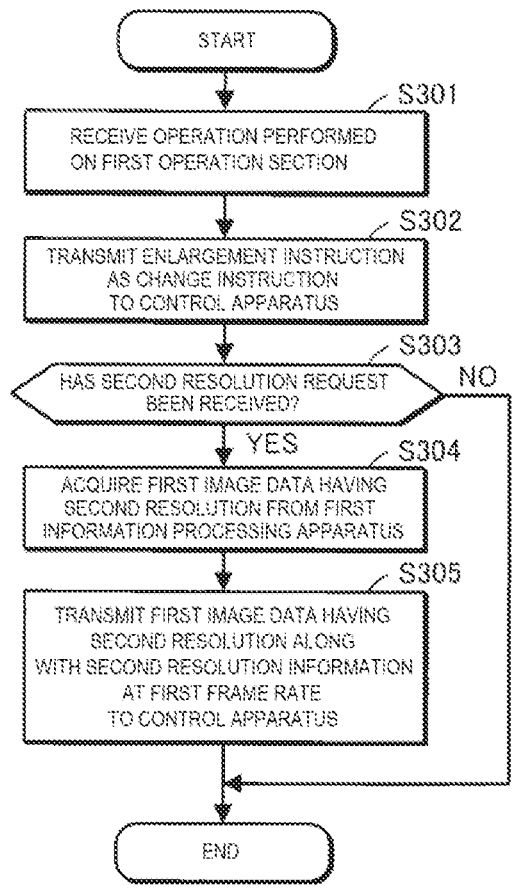
FIG. 9 is a flowchart for describing the action of the first terminal apparatus.

A11: Action of Terminal Apparatus 2 Performed When First Operation Section 212 is Operated The action of a terminal apparatus 2 performed when the first operation section 212 is operated will next be described. It is assumed for simplification of the description that the first terminal apparatus 21 is used as an example of the terminal apparatuses 2, that the first information processing apparatus 11 is used as an example of the information processing apparatuses 1, and that the projector A projects the first projection image P1 on the display surface 7. FIG. 9 is a flowchart for describing the action of the first terminal apparatus 21 performed when the first operation section 212 is operated.

When the first operation section 212 of the first terminal apparatus 21 is operated in the situation in which the first terminal apparatus 21 transmits the first image data having the first resolution to the control apparatus 3, the second processing section 215 receives the operation performed on the first operation section 212 in step S301.

The second processing section 215 subsequently transmits an enlargement instruction to enlarge the first area R1 as a change instruction to change the size of the first area R1 to the control apparatus 3 via the first communication section 213 in step S302.

Upon reception of the enlargement instruction transmitted as the change instruction, the control section 3 transmits a second resolution request that requests first image data having second resolution higher than the first resolution to the first terminal apparatus 21.

Subsequently, upon reception of the second resolution request via the first communication section 213 in step S303, the second processing section 215 acquires the first image data having the second resolution from the first information processing apparatus 11 in step S304.

In step S304, for example, the second processing section 215 transmits a second request that requests the first image data having the second resolution to the first information processing apparatus 11 and acquires the first image data having the second resolution transmitted from the first information processing apparatus 11 in response to the second request.

The second processing section 215 subsequently transmits the first image data having the second resolution to the control apparatus 3 at the first frame rate via the first communication section 213 in step S305. In step S305, the second processing section 215 transmits second resolution information representing the second resolution in addition to the first image data having the second resolution to the control apparatus 3 via the first communication section 213.

Figure 10:
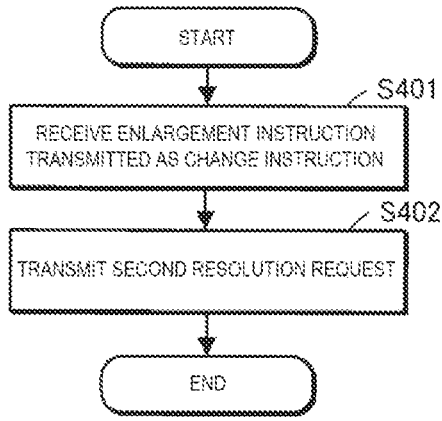
FIG. 10 is a flowchart for describing the action of the control apparatus.

A12: Action of Control Apparatus 3 Performed Upon Reception of Enlargement Instruction The action of the control apparatus 3 performed upon reception of the enlargement instruction will next be described. The first terminal apparatus 21 is used as an example of the terminal apparatuses 2 for simplification of the description. FIG. 10 is a flowchart for describing the action of the control apparatus 3 performed upon the reception of the enlargement instruction.

Upon the reception of the enlargement instruction transmitted as the change instruction via the second communication section 31 in step S401, the change section 352 of the control apparatus 3 transmits the second resolution request to the first terminal apparatus 21 in step S402 because only the first image G1 is present in the projection image.

Figure 11:
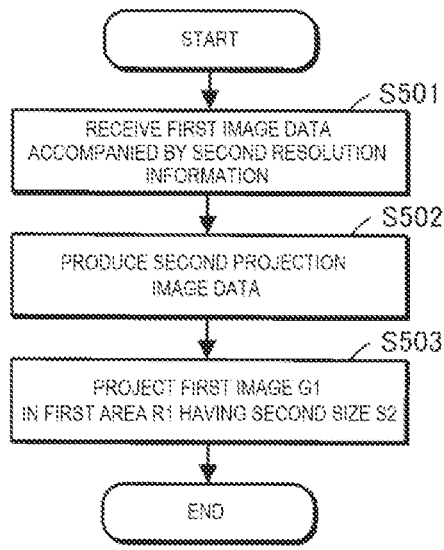
FIG. 11 is a flowchart for describing the action of the control apparatus.

A13: Action of Control Apparatus 3 Performed Upon Reception of First Image Data Having Second Resolution The action of the control apparatus 3 performed upon reception of the first image data having the second resolution will next be described. The first terminal apparatus 21 is used as an example of the terminal apparatuses 2 for simplification of the description. FIG. 11 is a flowchart for describing the action of the control apparatus 3 performed upon the reception of the first image data having the second resolution.

Upon the reception of the first image data having the second resolution accompanied by the second resolution information via the second communication section 31 in step S501, the display control section 351 of the control apparatus 3 uses the first image data having the second resolution to produce second projection image data representing the second projection image P2 in step S502.

The display control section 351 subsequently transmits the second projection image data to the projector 4 via the third communication section 33 to cause the projector 4 to project the second projection image P2 on the display surface 7 in step S503, as shown in FIG. 3 by way of example. That is, the display control section 351 causes the projector 4 to display the first image G1 in the first area R1 having the second size S2.

As described above, the display system 1000 displays the first image G1 having the first size S1 on the display surface 7 and then enlarges the first image G1 on the display surface 7.

The user can therefore enlarge the first image G1 after checking whether or not the first image G1 having the first size S1 and displayed on the display surface 7 is an image intended by the user. Sudden display of an image that has a size greater than the first size S1 and is not intended by the user can therefore be suppressed.

A14: Action of Camera 6 and Control Apparatus 3 Performed When User Manipulates First Image G1

Figure 12:
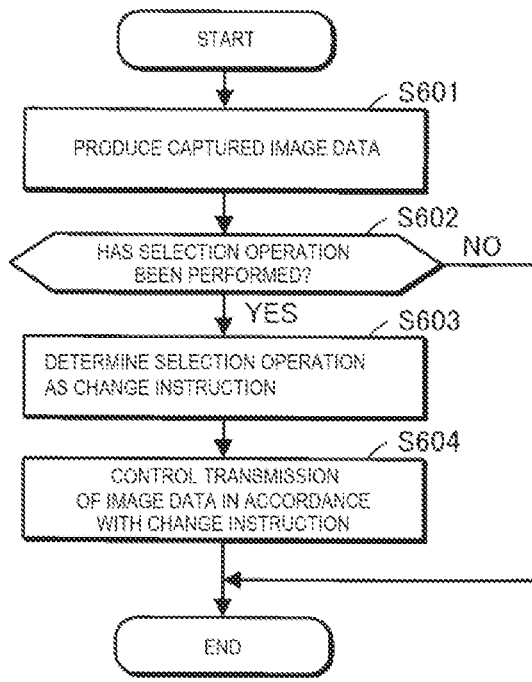
FIG. 12 is a flowchart for describing the actions of a camera and the control apparatus.

The actions of the camera 6 and the control apparatus 3 performed when the user manipulates the first image G1 on the display surface 7 will next be described. It is assumed for simplification of the description that the first image G1 is displayed in the first area R1 having the third size S3 on the display surface 7, the second image G2 is displayed in the second area R2 having the first size S1 on the display surface 7, the third image G3 is displayed in the third area R3 having the first size S1 on the display surface 7, and the fourth image G4 is displayed in the fourth area R4 having the first size S1 on the display surface 7, as shown in FIG. 4 by way of example. FIG. 12 is a flowchart for describing the actions of the camera 6 and the control apparatus 3 performed when the user manipulates the first image G1 on the display surface 7.

The user holds the shaft 5b of the pointing element 5 and causes the tip 5a of the pointing element 5 to come into contact, for example, with the first image G1 on the display surface 7.

The camera 6 subsequently produces captured image data by capturing an image of the display surface 7 in step S601. The captured image data represents the first image G1 at which the tip 5a of the pointing element 5 emitting infrared light has pointed. The camera 6 transmits the captured image data to the position identification section 44 via the fourth communication section 41 of the projector 4. The position identification section 44 analyzes the captured image data transmitted via the fourth communication section 41 to produce position data that identifies the position of the tip 5a of the pointing element 5 with respect to the display surface 7 and transmits the produced position data to the third communication section 33 of the control apparatus 3 via the fourth communication section 41.

The change section 352 of the control apparatus 3 subsequently receives the position data via the third communication section 33. The change section 352 subsequently analyzes the position data to evaluate whether or not the tip 5a of the pointing element 5 has been used to perform selection operation of selecting any of the first image G1 to the fourth image G4 in step S602. In the description, the captured image data represents the first image G1 at which the tip 5a of the pointing element 5 points, the change section 352 determines that selection operation has been performed.

When it is determined in step S602 that selection operation has been performed, the change section 352 determines the selection operation as the change instruction. Specifically, when the selection operation is operation of selecting an image displayed in an area that forms the display surface 7 and has the first size S1, the change section 352 determines the selection operation as an enlargement instruction to enlarge the area where the selected image is displayed. Further, when an area having the third size S3 is present on the display surface 7 in the situation in which selection operation determined as the enlargement instruction has been performed, the change section 352 determines the selection operation also as a reduction instruction to reduce the area having the third size S3.

Since the first image G1 is displayed in the first area R1 having the third size S3 on the display surface 7, the second image G2 is displayed in the second area R2 having the first size S1 on the display surface 7, the third image G3 is displayed in the third area R3 having the first size S1 on the display surface 7, and the fourth image G4 is displayed in the fourth area R4 having the first size S1 on the display surface 7, as shown in FIG. 4 by way of example, the selection operation is determined as the enlargement instruction and the reduction instruction. The enlargement instruction and the reduction instruction are each the change instruction.

The change section 352 subsequently causes the terminal apparatus 2 to change the amount of image data to be transmitted by the terminal apparatuses 2 per unit time period to the control apparatus 3 in accordance with the change instruction in step S604.

When the change section 352 determines in step S604 the selection operation as an enlargement instruction to enlarge the fourth area R4 where the fourth image G4 is displayed and a reduction instruction to reduce the first area R1 where the first image G1 is displayed, the processes are below carried out.

The change section 352 transmits a third resolution request that requests the fourth image data having third resolution to the fourth terminal apparatus 24 to increase the amount of fourth image data to be transmitted by the fourth terminal apparatus 24 per unit time period to the control apparatus 3.

The change section 352 transmits a first resolution request that requests the first image data having the first resolution to the first terminal apparatus 21 to decrease the amount of first image data to be transmitted by the first terminal apparatus 21 per unit time period to the control apparatus 3.

Figure 13:
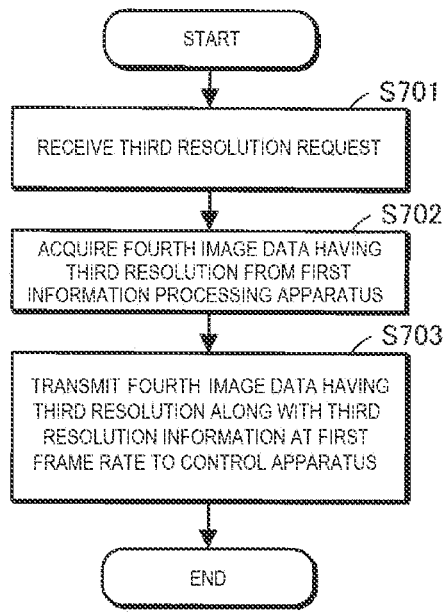
FIG. 13 is a flowchart for describing the action of a terminal apparatus.

A15: Action of Terminal Apparatus 2 Performed Upon Reception of Third Resolution Request The action of a terminal apparatus 2 performed upon reception of the third resolution request will next be described. The fourth terminal apparatus 24 is used as an example of the terminal apparatuses 2 for simplification of the description. FIG. 13 is a flowchart for describing the action of the terminal apparatus 2 performed upon the reception of the third resolution request.

When the second processing section 215 of the fourth terminal apparatus 24 receives the third resolution request via the first communication section 213 in step S701, the second processing section 215 carries out step S702. In step S702, the second processing section 215 transmits a third request that requests the fourth image data having the third resolution to the fourth information processing apparatus 14 and acquires the fourth image data having the third resolution transmitted from the fourth information processing apparatus 14 in response to the third request.

The second processing section 215 subsequently transmits the fourth image data having the third resolution at the first frame rate to the control apparatus 3 via the first communication section 213 in step S703.

That is, the second processing section 215 stops transmitting the fourth image data having the first resolution at the first frame rate to the control apparatus 3 via the first communication section 213 but starts transmitting the fourth image data having the third resolution at the first frame rate to the control apparatus 3 via the first communication section 213.

The amount of fourth image data transmitted by the fourth terminal apparatus 24 per unit time period to the control apparatus 3 therefore increases.

In step S703, the second processing section 215 transmits third resolution information representing the third resolution in addition to the fourth image data having the third resolution to the control section 3 via the first communication section 213.

Figure 14:
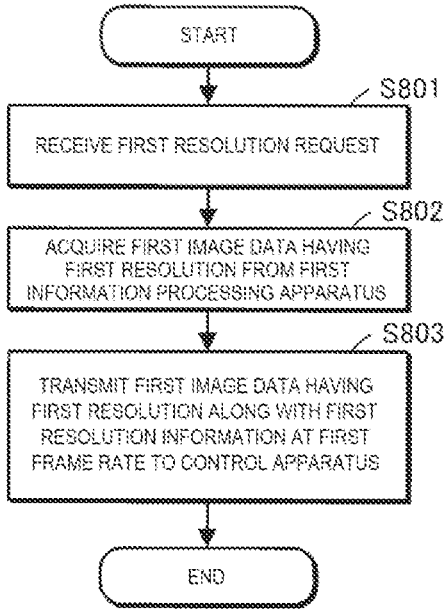
FIG. 14 is a flowchart for describing the action of the terminal apparatus.

A16: Action of Terminal Apparatus 2 Performed Upon Reception of First Resolution Request The action of a terminal apparatus 2 performed upon reception of the first resolution request will next be described. The first terminal apparatus 21 is used as an example of the terminal apparatuses 2 for simplification of the description. FIG. 14 is a flowchart for describing the action of the terminal apparatus 2 performed upon the reception of the first resolution request.

When the second processing section 215 of the first terminal apparatus 21 receives the first resolution request via the first communication section 213 in step S801, the second processing section 215 carries out step S802. The process in step S802 is the same as the process in step S102 shown in FIG. 7.

The second processing section 215 subsequently carries out step S803. The process in step S803 is the same as the process in step S103 shown in FIG. 7.

That is, the second processing section 215 stops transmitting the first image data having the third resolution at the first frame rate to the control apparatus 3 via the first communication section 213 but starts transmitting the first image data having the first resolution at the first frame rate to the control apparatus 3 via the first communication section 213.

The amount of first image data transmitted by the first terminal, apparatus 21 per unit time period to the control apparatus 3 therefore decreases.

A17: Action of Control Apparatus 3 Performed After Transmission of Third Resolution Request and First Resolution Request The action of the control apparatus 3 performed after transmission of the third resolution request and the first resolution request will next be described. The action of the control apparatus 3 after the transmission of the third resolution request to the fourth terminal apparatus 24 and transmission of the first resolution request to the first terminal apparatus 21 will be described for simplification of the description.

Figure 15:
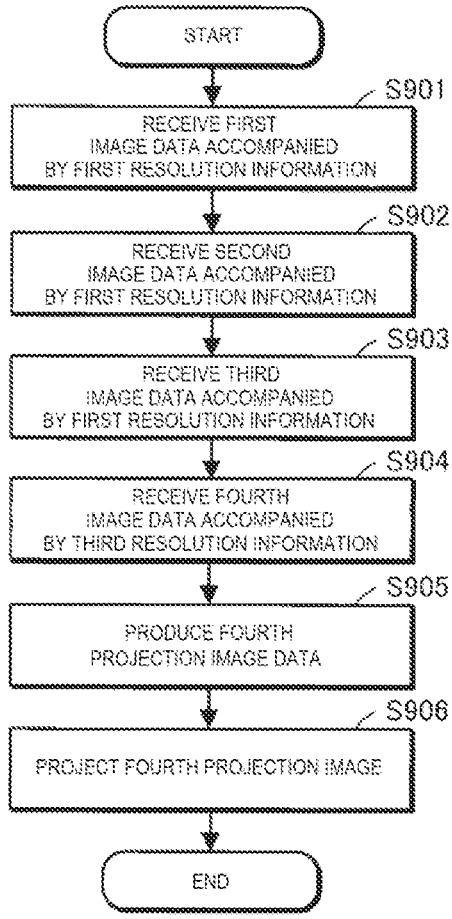
FIG. 15 is a flowchart for describing the action of the control apparatus.
Figure 16:
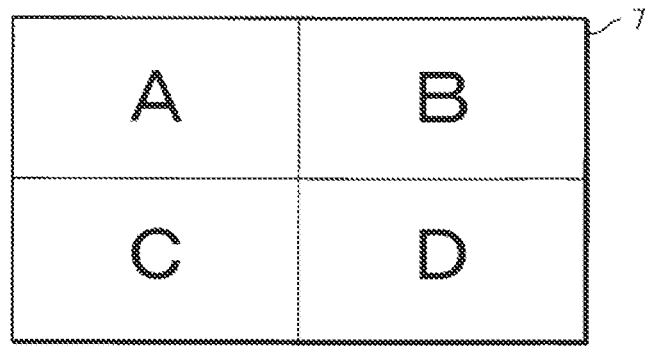
FIG. 16 shows an example of an image displayed on a display surface.

It is further assumed that before the first resolution request and the third resolution request are transmitted, the first image G1 is displayed in the first area R1 having the third size S3 on the display surface 7, the second image G2 is displayed in the second area R2 having the first size S1 on the display surface 7, the third image G3 is displayed in the third area R3 having the first size S1 on the display surface 7, and the fourth image G4 is displayed in the fourth area R4 having the first size S1 on the display surface 7, as shown in FIG. 4 by way of example. FIG. 15 is a flowchart for describing the action of the control apparatus 3 performed after the transmission of the third resolution request and the first resolution request.

After the change section 352 of the control apparatus 3 transmits the third resolution request and the first resolution request, the display control section 351 receives the first image data having the first resolution accompanied by the first resolution information from the first terminal apparatus 21 via the second communication section 31 in step S901.

The display control section 351 subsequently receives the second image data having the first resolution accompanied by the first resolution information from the second terminal apparatus 22 via the second communication section 31 in step S902.

The display control section 351 subsequently receives the third image data having the first resolution accompanied by the first resolution information from the third terminal apparatus 23 via the second communication section 31 in step S903.

The display control section 351 subsequently receives the fourth image data having the third resolution accompanied by the third resolution information from the fourth terminal apparatus 24 via the second communication section 31 in step S904. The order of steps S901 to S904 is changeable as appropriate.

The display control section 351 subsequently uses the first image data having the first resolution, the second image data having the first resolution, the third image data having the first resolution, and the fourth image data having the third resolution to produce fourth projection image data representing a fourth projection image P4 in step 3905.

The display control section 351 subsequently transmits the fourth projection image data to the projector 4 via the third communication section 33 to cause the projector 4 to project the fourth projection image P4 on the display surface 7 in step S906, as shown in FIG. 5 by way of example. That is, the display control section 351 causes the projector 4 to reduce the first area R1 where the first image G1 is displayed and enlarge the fourth area R4 where the fourth image G4 is projected.

A18: Overview of First Embodiment

The method for operating the control apparatus 3 and the control apparatus 3 according to the present embodiment described above include the following aspects.

The display control section 351 causes the projector 4 to display the first image G1 based on the first image data transmitted from the first terminal apparatus 21 to the control apparatus 3 in the first area R1 of the display surface 7. The change section 352 causes the first terminal apparatus 21 to change the amount of first image data to be transmitted by the first terminal apparatus 21 per unit time period to the control apparatus 3 in accordance with a change instruction to change the size of the first area R1.

According to the aspect described above, the change section 352 causes the first terminal apparatus 21 to change the amount of first image data to be transmitted by the first terminal apparatus 21 per unit time period to the control apparatus 3 in accordance with the change instruction. Therefore, even when the size of the first area R1 is changed, a decrease in the quality of the first image G1 or congestion in the communication between the first terminal apparatus 21 and the control apparatus 3 can be reduced.

When the plurality of terminal apparatuses 2 each transmit image data to the control apparatus 3, suppressing occurrence of congestion in the communication is particularly effective. For example, an increase in the use rate of a communication band usable for the communication between each of the plurality of terminal apparatuses 2 and the control apparatus 3 can be suppressed, and failure in the communication of image data can be suppressed.

When the change instruction is a reduction instruction to reduce the first area R1, the change section 352 causes the first terminal apparatus 21 to decrease the amount of first image data to be transmitted by the first terminal apparatus 21 per unit time period to the control apparatus 3.

The first image G1 displayed in the first area R1 is reduced as the first area R1 is reduced. When the first image G1 is reduced, the amount of data necessary for display of the first image G1 decreases.

According to the aspect described above, when the change instruction is a reduction instruction, the amount of first image data to be transmitted by the first terminal apparatus 21 per unit time period to the control apparatus 3 can be decreased, whereby congestion in the communication is unlikely to occur.

When the change instruction is an enlargement instruction to enlarge the first area R1, the change section 352 causes the first terminal apparatus 21 to increase the amount of first image data to be transmitted by the first terminal apparatus 21 per unit time period to the control apparatus 3.

The first image G1 displayed in the first area R1 is enlarged as the first area R1 is enlarged. When the first image G1 is enlarged, the amount of data necessary for display of the first image G1 increases to suppress a decrease in the quality of the first image G1.

According to the aspect described above, when the change instruction is an enlargement instruction, the amount of first image data to be transmitted by the first terminal apparatus 21 per unit time period to the control apparatus 3 can be increased, whereby a decrease in the quality of the first image G1 can be suppressed.

The change section 352 changes the amount of first image data to be transmitted by the first terminal apparatus 21 per unit time period to the control apparatus 3 by causing the first terminal apparatus 21 to change the resolution of the first image data in accordance with the change instruction.

According to the aspect described above, a simple process of changing the resolution of the first image data allows a change in the amount of first image data to be transmitted by the first terminal apparatus 21 per unit time period to the control apparatus 3.

The change section 352 may consider, as the change instruction, operation of selecting the first image G1 in the situation in which the projector 4 displays the first image G1 in the first area R1 and the second image G2 in the second area R2.

According to the aspect described above, for example, the user can input a change instruction by simple operation of selecting an image displayed on the display surface 7.

The first terminal apparatus 21 transmits, as the first image data, image data received from the first information processing apparatus 11 to the control apparatus 3.

According to the aspect described above, for example, when the first terminal apparatus 21 transmits image data representing the display image to be displayed by the first information processing apparatus 11 to the control apparatus 3, the projector 4 can display the display image displayed by the first information processing apparatus 11.

B: Variations

Aspects of variations of the embodiment presented above by way of example will be presented below by way of example. Two or more aspects arbitrarily selected from those presented below by way of example may be combined with each other as appropriate to the extent that the aspects to be combined with each other do not contradict each other.

B1: First Variation

In the first embodiment, the change section 352 causes the first terminal apparatus 21 to change the resolution of first image data in accordance with a change instruction to change the amount of first image data to be transmitted by the first terminal apparatus 21 per unit time period to the control apparatus 3, that is, the first amount of transmitted data.

The change section 352 may instead change the first amount of transmitted data by causing the first terminal apparatus 21 to change the data format of the first image data in accordance with a change instruction.

For example, the change section 352 uses a compressed data request that requests first image data in a compressed data format in place of the first resolution request and uses a non-compressed data request that requests first image data in a non-compressed format in place of the second and third resolution requests. Upon reception of the compressed data request, the first terminal apparatus 21 transmits the first image data in the compressed data format to the control apparatus 3 at the first frame rate. Upon reception of the non-compressed data request, the first terminal apparatus 21 transmits the first image data in the non-compressed data format to the control apparatus 3 at the first frame rate. The control apparatus 3 uses the first image data in the compressed data format to produce projection image data representing the first image G1 to be projected in the first area R1 having the first size S1. The control apparatus 3 uses the first image data in the non-compressed data format to produce projection image data representing the first image G1 to be projected in the first area R1 having the second size S2. The control apparatus 3 uses the first image data in the non-compressed data format to produce projection image data representing the first image G1 to be projected in the first area R1 having the third size S3. The data format of image data is not limited to the compressed data format or the non-compressed data format and is changeable as appropriate. According to the aspect described above, the first amount of transmitted data can be controlled by a simple process of changing the data format of the first image data.

B2: Second Variation

The change section 352 may instead change the first amount of transmitted data by causing the first terminal apparatus 21 to change a compression method for compressing the first image data in accordance with a change instruction. For example, the change section 352 uses an MPEG4 request that specifies the MPEG4 (Moving Picture Experts Group phase 4) scheme in place of the first resolution request and uses an MPEG2 request that specifies the MPEG2 (Moving Picture Experts Group phase 2) scheme in place of the second and third resolution requests.

Upon reception of the MPEG4 request, the first terminal apparatus 21 transmits the first image data compliant with the MPEG4 scheme to the control apparatus 3 at the first frame rate. Upon reception of the MPEG2 request, the first terminal apparatus 21 transmits the first image data compliant with the MPEG2 scheme to the control apparatus 3 at the first frame rate. The control apparatus 3 uses the first image data in the MPEG4 format to produce the first image G1 to be projected in the first area R1 having the first size S1. The control apparatus 3 uses the first image data in the MPEG2 format to produce the first image G1 to be projected in the first area R1 having the second size S2 and the first image G1 to be projected in the first area R1 having the third size S3. According to the aspect described above, the first amount of transmitted data can be controlled by a simple process of changing the method for compressing the first image data.

MPEG4 and MPEG2 differ from each other in terms of compression ratio. A second variation therefore encompasses an aspect in which the change section 352 changes the first amount of transmitted data by causing the first terminal apparatus 21 to change in accordance with a change instruction the compression ratio at which the first image data is compressed. Therefore, according to the aspect described above, the first amount of transmitted data can be controlled by a simple process of changing the compression ratio at which the first image data is compressed. The method for compressing image data is not limited to the MPEG4 or MPEG2 scheme and is changeable as appropriate.

B3: Third Variation

The change section 352 may instead change the first amount of transmitted data by causing the first terminal apparatus 21 to change the number of colors representing the first image data in accordance with a change instruction. For example, the change section 352 uses an M color request that requests M colors, the number M being the upper limit of the number of colors representing the first image data, in place of the first resolution request and uses an N color request that requests N colors, the number N being the upper limit of the number of colors representing the first image data, in place of the second and third resolution requests. M represents a positive integer, and N is a positive integer greater than M. When the number of colors representing the first image data is greater than M, the change section 352 changes the first amount of transmitted data by causing the first terminal apparatus 21 to change the number of colors representing the first image data in accordance with a change instruction.

Upon reception of the M color request, the first terminal apparatus 23 transmits the first image data having colors the number of which is smaller than M to the control apparatus 3 at the first frame rate. Upon reception of the N color request, the first terminal apparatus 21 transmits the first image data having colors the number of which is greater than or equal to M but smaller than or equal to N to the control apparatus 3 at the first frame rate. The control apparatus 3 uses the first image data having the colors the number of which is smaller than M to produce the first image G1 to be projected in the first area R1 having the first size S1. The control apparatus 3 uses the first image data having the colors the number of which is greater than or equal to M but smaller than or equal to N to produce the first image G1 to be projected in the first area R1 having the second size S2. The control apparatus 3 uses the first image data having the colors the number of which is greater than or equal to M but smaller than or equal to N to produce the first image G1 to be projected in the first area R1 having the third size S3. According to the aspect described above, the first amount of transmitted data can be controlled by a simple process of changing the number of colors representing the first image data.

B4: Fourth Variation

The change section 352 may instead change the first amount of transmitted data by causing the first terminal apparatus 21 to change in accordance with a change instruction the frame rate at which the first image data is transmitted. According to the aspect described above, the first amount of transmitted data can be controlled by a simple process of changing the frame rate at which the first image data is transmitted.

B5: Fifth Variation

In the first embodiment and the first to fourth variations, a terminal apparatus 2 may acquire image data having specific resolution from an information processing apparatus 1, and the terminal apparatus 2 may change the first amount of transmitted data in accordance with a request from the control apparatus 3.

B6: Sixth Variation

In the first embodiment and the first to fifth variations, the change section 352 may receive a change instruction, for example, from the second operation section 32. When the first operation section 212 of each of the terminal apparatuses 2 includes a selection button for selecting an image displayed on the display surface 7, the change section 352 may receive a change instruction via the selection button. When the information processing apparatuses 1 each include an image selection button for selecting an image displayed on the display surface 7, the change section 352 may receive a change instruction via the image selection button. Further, for example, the first display section 111 of each of the information processing apparatuses 1 may display an image selection button for selecting an image displayed on the display surface 7, and the change section 352 may receive a change instruction when the user issues an instruction of operation of the image selection button to the information processing apparatus 1. In this process, the user may issue the instruction of operation of the image selection button by operating the information processing apparatuses 1, or when an FPD with a touch panel is used as the first display section 111, the user may touch the touch panel with an object, such as a finger. The change section 352 may receive a change instruction via operation performed on the projector 4 via a remote control.

B7: Seventh Variation

When the first operation section 212 of each of the terminal, apparatuses 2 includes a display instruction button that causes a plurality of images being displayed on the display surface 7 to have the same size, the change section 352 may transmit the third resolution request to each of the terminal apparatuses 2 in response to operation performed on the display instruction button, and the display control section 351 may use image data having the third resolution to cause the projector 4 to display the plurality of images being displayed and having the same size on the display surface 7.

When any of the first image G1 to the fourth image G4 in the third projection image P3 is manipulated in a situation in which the display surface 7 has room for image display, the display control section 351 may enlarge the manipulated image with no change in the size of the images that have not been manipulated. In this case, the change section 352 transmits, for example, the third resolution request to the source from which image data representing the manipulated image has been transmitted.

B7: Eighth Variation

The control apparatus 3 may be accommodated in the display apparatus, such as the projector 4. When an FPD with a touch panel is used as the display apparatus, a manipulated image may be identified by a touch performed on the touch panel with an object, such as a finger. In this case, the camera 6 and the pointing element 5 can be omitted. When the terminal apparatuses 2 each include an FPD with a touch panel, any of the first image G1 to the fourth image G4 may be selected via the FPD with a touch panel of the terminal apparatus 2. When the information processing apparatuses 1 each include an FPD with a touch panel, any of the first image G1 to the fourth image G4 may be selected via the FPD with a touch panel of the information processing apparatus 1. The change instruction may be a voice instruction. In this case, the change section 352 receives a change instruction via a microphone that receives voice. The change instruction may be a gesture instruction. In this case, the change section 352 receives a change instruction via the camera 6 that captures an image of the gesture.

B7: Ninth Variation

The liquid crystal light valves 433 are used as an example of the light modulator, and the light modulator is not limited to liquid crystal light valves and can be changed as appropriate. For example, the light modulator may be based, for example, on a scheme using one digital mirror device, in place of a liquid crystal panel or a DMD, a configuration capable of modulating the light outputted from the light source 432 is employable as the light modulator.

What is claimed is:

1. A method for operating an electronic apparatus, the method comprising:
    displaying, by a display apparatus, a first image based on first image data transmitted from a first terminal apparatus to the electronic apparatus in a first area of a display surface and a second image based on second image data transmitted from a second terminal apparatus to the electronic apparatus in a second area of the display surface that is different from the first area;
    changing, by the first terminal apparatus, an amount of the first image data transmitted by the first terminal apparatus per unit time period to the electronic apparatus in accordance with a change instruction to change a size of the first area; and
    changing, by the second terminal apparatus, an amount of the second image data transmitted by the second terminal apparatus per unit time period to the electronic apparatus in accordance with a change instruction to change a size of the second area,
    wherein operation of selecting the first image and the second image is determined as the change instruction,
    wherein when the change instruction is a reduction instruction to reduce the first area, the first terminal apparatus decreases the amount of the first image data, and
    wherein when the change instruction is an enlargement instruction to enlarge the second area, the second terminal apparatus increases the amount of the second image data.

2. The operation method according to claim 1,
    wherein the changing includes changing the amount of the first image data by changing a data format of the first image data in accordance with the change instruction.

3. The operation method according to claim 1,
    wherein the changing includes changing the amount of the first image data by changing resolution of the first image data in accordance with the change instruction.

4. The operation method according to claim 1,
    wherein the changing includes changing the amount of the first image data by changing a compression method for compressing the first image data in accordance with the change instruction.

5. The operation method according to claim 1,
    wherein the changing includes changing the amount of the first image data by changing a compression ratio at which the first image data is compressed in accordance with the change instruction.

6. The operation method according to claim 1,
    wherein the changing includes changing the amount of the first image by changing the number of colors representing the first image data in accordance with the change instruction.

7. The operation method according to claim 1,
    wherein the changing includes changing the amount of the first image data by changing a frame rate at which the first image data is transmitted in accordance with the change instruction.

8. An electronic apparatus comprising:
    one or more processors configured to
        cause a display apparatus to display a first image based on first image data transmitted from a first terminal apparatus to the electronic apparatus in a first area of a display surface and a second image based on second image data transmitted from a second terminal apparatus to the electronic apparatus in a second area of the display surface that is different from the first area;
        cause the first terminal apparatus to change an amount of the first image data transmitted by the first terminal apparatus per unit time period to the electronic apparatus in accordance with a change instruction to change a size of the first area; and
        cause the second terminal apparatus to change an amount of the second image data transmitted by the second terminal apparatus per unit time period to the electronic apparatus in accordance with a change instruction to change a size of the second area,
    wherein when the change instruction is a reduction instruction to reduce the first area, the one or more processors are configured to cause the first terminal apparatus to decrease the amount of the first image data, and
    wherein when the change instruction is an enlargement instruction to enlarge the second area, the one or more processors are configured to cause the second terminal apparatus to increase the amount of the second image data.

* * * * *